United States Patent [19]

Tomilo et al.

[11] 4,452,946
[45] Jun. 5, 1984

[54] ACIDPROOF LINING MATERIAL

[75] Inventors: Vladimir M. Tomilo; Stanislav A. Potapov; Nikolai G. Khudyakov; Svetlana M. Travnitskaya, all of Tolyatti; Vladimir M. Kornienko, Moscow; Viktor V. Dobroljubov, Moscow; Sergei V. Chekhovsky, Moscow; Galina V. Fedorenko, Moscow; Valentina I. Grabylnikova, Moscow, all of U.S.S.R.

[73] Assignee: Vsesojuzny Nauchno-Issledovatelsky Institut Nerudnykh Stroitelnykh Materialov I/Gidromekhanizatsii, Tolyatti, U.S.S.R.

[21] Appl. No.: 512,161

[22] Filed: Jul. 8, 1983

[51] Int. Cl.$^3$ .............................................. C08K 3/04
[52] U.S. Cl. ..................................... 524/541; 524/496
[58] Field of Search ........................ 524/541, 495, 496

[56] References Cited

U.S. PATENT DOCUMENTS 3,867,333  2/1975  Vanderbilt .......................... 524/496
4,282,288  8/1981  Yoshino et al. ..................... 524/496

FOREIGN PATENT DOCUMENTS 53-133217  11/1978  Japan ................................. 524/496
56-125273  10/1981  Japan ................................. 524/541

Primary Examiner—Lewis T. Jacobs
Attorney, Agent, or Firm—Ladas & Parry

[57] ABSTRACT

An acidproof lining material consisting of natural amorphous graphite, novolac and resol phenol-formaldehyde resin and a hardener, with the ratio of the components being as follows (in % by weight):

| natural amorphous graphite | 70–80 |
|---|---|
| novolac phenol-formaldehyde resin | 9–22.5 |
| hardener | 1–2.5 |
| resol phenol-formaldehyde resin | 5–15. |

1 Claim, No Drawings

ACIDPROOF LINING MATERIAL

FIELD OF APPLICATION

The present invention relates to graphite-bearing acidproof lining materials that can be used for manufacturing lining articles, such as tiles, blocks, etc. to protect equipment against corrosion in chemical, petrochemical and other branches of industry. Presence of chlorine-, fluorine-, silicon- and sulfur-containing compounds in reaction media in manufacture of mineral acids and fertilizers limits use of lining materials based on ceramics, mineral ceramics and glass ceramics which are not sufficiently acidproof in these media. Acidproof graphite-bearing materials are used as lining materials in the above manufacturing processes.

STATE OF THE ART

Known in the art are acidproof lining materials based on artificial graphite and such polymeric resins as phenol-formaldehyde, furan, epoxy and other resins "Carbon-Graphite Materials and Their Use in Chemical Industry" by V. N. Krylov and Y. N. Vylk, M., "Chemia," 1965, pp. 44–47; "Carbon-Graphite Materials" by A. S. Fialkov, M., "Energya," 1979, p. 61, 62; "A Reference Book on Carbon-Graphite Materials" by M. I. Rogaylin, E. F. Tchalych, L., "Chemia," 1974, pp. 159, 161–164; "Wear-Resistant Materials in Chemical Machine-Building" reference book edited by Y. M. Vinogradov, L., "Machinostroyenye," 1977, pp. 166–168, 175–178.

The known acidproof lining materials exhibit sufficient chemical resistance in aggressive media.

However, the above acidproof lining materials contain deficient artificial graphite which manufacture requires use of costly carbon-containing raw materials. In addition, in the case of use of phenol-formaldehyde resins the acidproof lining materials produced do not possess sufficiently high strength and wear-resistant characteristics.

BRIEF DESCRIPTION OF THE INVENTION

It is an object of the present invention to provide an acid-proof lining material having high strength and wear-resistant characteristics.

Another object of the invention is to produce an acidproof lining material that would not contain deficient artificial graphite.

Yet another object of the invention is to produce an acid-proof lining material manufactured by a simple technology.

In accordance with the above and other objects the invention resides in that proposed is an acidproof lining material containing graphite, novolac and resol phenol-formaldehyde resins and a hardener, wherein, according to the invention, it contains natural amorphous graphite, with the ratio of the components in the acid-proof lining material being as follows (in weight %):

| natural amorphous graphite | 70–80 |
| novolac phenol-formaldehyde resin | 9–22.5 |
| hardener | 1–2.5 |
| resol phenol-formaldehyde resin | 5–15. |

The acidproof lining material according to the invention is characterized by high chemical resistance and high physical and mechanical indices that are given below. This makes it possible to use it for effective protection of chemical equipment in aggressive media.

Owing to peculiarities of its structure and surface properties natural amorphous graphite possesses an increased adsorptive capacity with respect to the resins used, which provides for high physical and mechanical characteristics of the lining material on its base.

Differences in the structure of natural amorphous graphite, as compared to that of artificial graphite, can be seen from Table I.

TABLE I

| Type of Graphite | Parameters of Lattice, Sizes of Crystals Å | | | Degree of Graphitization |
| --- | --- | --- | --- | --- |
| | $d_{002}$, Å | $L_a$ | $L_c$ | |
| Artificial electrode graphite | 3.365 | 370 | 220 | 1.01 |
| Natural amorphous graphite | 3.44 | 85 | 40 | ~0.5 |

Notes:
1. Parameters of the lattice are determinated with the aid of an X-ray diffractometer.
2. The degree of graphitization was determinated by the roentgenographic method according to the ratio of intensity of lines (112) and (110).

As it is seen from Table I, natural amorphous graphite has no three-dimensional ordered structure to which the great interlayer distance $d_{002}$ and small sizes of crystallites $L_a$ and $L_c$ testify. The acidproof lining material produced on the basis of this graphite is characterized by high strength indices due to the structure of the latter.

A high content of graphite in the initial ore (85% on the average) makes it possible to use the ore for producing an acidproof lining material without any preliminary benefication, which predetermines a low cost of said lining material. At the same time, ash admixtures (15–20%) in the ore contain mainly minerals including oxides of titanium, aluminium and silicon which are resistant to the action of the majority of mineral acids. Said oxides are essentially fine inclusions in the graphite structure.

During operation of an acidproof lining material in aggressive media the so-called "scanning" effect from the side of not dissolved structured films of polymer resins influences on its chemical resistance (phenol-formaldehyde resins are characterized by high chemical resistance in acid media).

It is known that with the increase of graphite content in an acidproof lining material, the chemical resistance of the latter becomes greater because graphite is a chemically inert substance. The greater part of the lining material surface is taken by graphite, higher is its chemical resistance, the less is water absorption and swelling in aggressive media. Therefore, a highly-filled lining material containing 70–80% by weight graphite is of practical interest. Use of an acidproof lining material containing less than 70% by weight graphite is inexpedient because of a decreased chemical resistance of the material. When using graphite in an amount exceeding 80% by weight, there is observed a decrease in the strength characteristics of the lining material.

Use of an acidproof lining material containing less than 9% by weight novolac phenol-formaldehyde resin is inexpedient as the strength characteristics of the lining material are decreased. Use of novolac phenol-formaldehyde resin in the composition of a lining material in an amount of more than 22.5% by weight is inexpedient as this brings about high inner stresses in the lining material and formation of microcracks.

A hardener for a novolac phenol-formaldehyde resin is used in amounts (1–2.5% by weight) necessary to ensure complete solidification of said resin.

Use of an acidproof lining material containing resol phenolformaldehyde resin in an amount of less than 5 and more than 15% by weight is inexpedient as this results in lowering strength characteristics of the lining material.

DETAILED DESCRIPTION OF THE INVENTION

The acidproof lining material according to the invention is produced in accordance with a known technology used for production of an acidproof lining material based on artificial graphite.

To do this, ground natural amorphous graphite (the residue on the sieve with the cell size of 71 mcmm should not exceed 10% by weight) is mixed with novolac phenol-formaldehyde resin, a hardener (for example, hexamethylenetetramine, triethylenetetramine, paraform, etc.) and a solution of resol phenol-formaldehyde resin in ethanol, acetone or other solvents. The viscosity of the solution is 25 seconds according to the B3-viscosimeter. After thorough mixing, drying at 60°–80° C. to remove the solvent and grinding the press-composition is pressed at a specific pressure of 15–20 MPa and a temperature of 160°–180° C. whereupon it is kept at 160°–180° C. for 2–5 hours for a complete solidification of the phenol-formaldehyde resins. The method of producing the acidproof lining material is simple both from the viewpoint of technology and the equipment used.

The acidproof lining material according to the invention can be also produced by the method which consists in that blocks are pressed of natural amorphous graphite, the blocks are several times impregnated with solutions of said phenol-formaldehyde resins, and then the impregnated blocks are kept at a temperature of 150°–170° C. for 2–6 hours for the above resins to solidify. However, this method is less technological, more labour-consuming and produces an acidproof lining material of worse physical and mechanical characteristics.

For better understanding of the present invention, given below are examples of its specific embodiment. After the examples there is given a table showing physical and mechanical characteristics and chemical resistance of the acidproof lining material produced in Examples 1–5 and those of the conventional material. The composition of the conventional material is given below.

EXAMPLE 1

Produced was an acidproof lining material of the following composition (in % by weight):

| ground natural amorphous graphite | 70 |
|---|---|
| novolac phenol-formaldehyde resin | 22.5 |
| hexamethylenetetramine | 2.5 |
| resol phenol-formaldehyde resin | 5. |

For this, ground natural amorphous graphite was mixed in an amount of 70% by weight with novolac phenol-formaldehyde resin taken in an amount of 22.5% by weight, hexamethylenetetramine taken in an amount of 2.5% by weight and a solution of resol phenol-formaldehyde resin in ethanol, taken in an amount of 5% by weight as recalculated relative to the dry residue. The viscosity of the solution was 25 seconds according to the B3-4 viscosimeter. The components were carefully mixed and, then, dried at 80° C. until the solvent was removed. Then, the press-composition obtained was ground until the grain sizes were 200–300 mcmm, whereupon the press-composition was heated in a thermal cabinet up to a temperature of 120° C. to transfer the phenol-formaldehyde resins into a viscous-liquid state. Then, the press-composition was pressed in nondetachable mould at a specific pressure of 15 MPa. The temperature in the working space of the mould was 180° C. The composition was kept at the above specific pressure for 5 minutes. The pressed articles were subjected to an additional thermal treatment at a temperature of 180° C. during 2 hours until the resins got completely solidified, and were subsequently cooled down to 20° C.

EXAMPLE 2

Produced was an acidproof lining material of the following composition (in % by weight):

| natural amorphous graphite | 75 |
|---|---|
| novolac phenol-formaldehyde resin | 3 |
| hexamethylenetetramine | 1 |
| resol phenol-formaldehyde resin | 15. |

The technology of producing the acidproof lining material was analogous to that used in Example 1 except for the only difference that the resol phenol-formaldehyde resin was used as a solution in acetone.

EXAMPLE 3

Produced was an acidproof lining material of the following composition (in % by weight):

| natural amorphous graphite | 75 |
|---|---|
| novolac phenol-formaldehyde resin | 13.5 |
| hexamethylenetetramine | 1.5 |
| resol phenol-formaldehyde resin | 10. |

The technology of producing the acidproof lining material was analogous to that used in Example 1.

EXAMPLE 4

Produced was an acidproof lining material of the following composition (in % by weight):

| natural amorphous graphite | 80 |
|---|---|
| novolac phenol-formaldehyde resin | 3 |
| hexamethylenetetramine | 1 |
| resol phenol-formaldehyde resin | 10. |

The technology of producing the acidproof lining material was analogous to that used in Example 1.

EXAMPLE 5

Produced was an acidproof lining material of the following composition (in % by weight):

| natural amorphous graphite | 80 |
|---|---|
| novolac phenol-formaldehyde resin | 3.5 |
| hexamethylenetetramine | .5 |
| resol phenol-formaldehyde resin | 5. |

The technology of producing the acidproof lining material was analogous to that used in Example 1.

The physical and mechanical characteristics and the chemical resistance of the acidproof lining materials produced in the above examples and those of the conventional acidproof lining material are given in Table 2. The composition of the said conventional acidproof lining material is as follows (in % by weight):

| | |
|---|---|
| artificial graphite, middlings | 33 |
| artificial graphite pulverized | 43.6 |
| phenol-formaldehyde binder comprising novolac phenol-formaldehyde resin, a hardener and a plasticizing addition - stearin | 23.4. |

It should be noted that the technology of producing the conventional material given in Table 2 for comparison purposes is more complicated as compared to the technology of producing the acidproof lining material according to the invention because use of artificial graphite in the form of middlings and of the plasticizing addition-stearin requires an additional stage of rolling on heated rollers.

Wear-resistance of the acidproof lining material was determined by measuring the sample volume before and after tests. The testing method consisted in that a sample volume before and after tests. The testing method consisted in that a sample of an acidproof lining material in the form of a cylinder of a diameter of 16 mm or cubes of dimensions of 20×20×20 mm was brought in contact with a friction surface made of an abrasive material. The length of a wearing run was 40 m.

Changes in the sample volume were found from the following equation:

$$и = (P - P_j)/(\rho \cdot N),$$

wherein

и is a change in the sample volume, in $cm^3$.

$P$ and $P_j$ are weights of the sample before and after the tests, in gr, $\rho$ is the density of the sample, in $gr/cm^3$;

N is correction coefficient equal to 1.

As seen from Table 2, as compared to the conventional acidproof lining material, the acidproof lining material based on natural amorphous graphite according to the invention possesses better physical and mechanical characteristics and wear-resistance. For example, the tensile and cross-breaking strengths of the material according to the invention are by 1.5–2 times higher than those of the conventional material, and the compression strength is by 1.2–1.5 times higher than that of the conventional one. The wear-resistance of the material of the invention is by 10–20% higher than that of the conventional acidproof lining material.

We claim:

TABLE 2

| Nos. 1 | Indices 2 | Example 1 3 | Example 2 4 | Example 3 5 | Example 4 6 | Example 5 7 | Known acidproof lining material 8 |
|---|---|---|---|---|---|---|---|
| 1 | Apparent density, in $kg/m^3$ | $1.8 \cdot 10^3$ | $1.75 \cdot 10^3$ | $1.78 \cdot 10^3$ | $1.76 \cdot 10^3$ | $1.78 \cdot 10^3$ | $(1.8-1.85) \cdot 10^3$ |
| 2 | Tensile strength, in MPa | 30.0 | 19.5 | 28.0 | 26.5 | 28.0 | 15–20 |
| 3 | Cross-breaking strength, in MPa | 40.0 | 30.0 | 36.0 | 34.0 | 35.5 | 20–30 |
| 4 | Compression strength, in MPa | 120.0 | 80.0 | 110.0 | 100.0 | 90.0 | 70–100 |
| 5 | Heat resistance, in °C. | 190 | 190 | 190 | 190 | 190 | 190 |
| 6 | Water absorption, $gr/dm^2$ | 0.01 | 0.05 | 0.015 | 0.02 | 0.025 | 0.01–0.1 |
| 7 | *Wear resistance, in $cm^3$ | 0.27 | 0.32 | 0.28 | 0.3 | 0.3 | 0.33–0.35 |
| 8 | Chemical resistance: extraction phosphoric acid ($P_2O_5$-54%) at 120° C. | resistant | resistant | resistant | resistant | resistant | resistant |
| 9 | 20% fluosilicic acid at 80° C. | " | " | " | " | " | " |
| 10 | 60% sulphuric acid at 80° C. | " | " | " | " | " | " |

1. An acidproof lining material consisting of natural amorphous graphite, novolac and resol phenol-formaldehyde resins and a hardener, the ratio of said components in the acidproof lining material being as follows (in % by weight):

| | |
|---|---|
| natural amorphous graphite | 70–80 |
| novolac phenol-formaldehyde resin | 9–22.5 |
| hardener | 1–2.5 |
| resol phenol-formaldehyde resin | 5–15. |

* * * * *